United States Patent
Jiang et al.

(10) Patent No.: US 9,207,948 B2
(45) Date of Patent: Dec. 8, 2015

(54) MULTI-BIOS CIRCUIT AND SWITCHING METHOD BETWEEN MULTIPLE BIOS CHIPS

(71) Applicant: Celestica Technology Consultancy (Shanghai) Co., Ltd., Shanghai (CN)

(72) Inventors: Jiaping Jiang, Shanghai (CN); Jinbao Wang, Shanghai (CN)

(73) Assignee: Celestica Technology Consultancy (Shanghai) Co., Ltd., Shanghai (CN)

( * ) Notice: Subject to any disclaimer, the term of this patent is extended or adjusted under 35 U.S.C. 154(b) by 302 days.

(21) Appl. No.: 13/890,854

(22) Filed: May 9, 2013

(65) Prior Publication Data
US 2013/0305027 A1 Nov. 14, 2013

(30) Foreign Application Priority Data
May 10, 2012 (CN) .......................... 2012 1 0143810

(51) Int. Cl.
*G06F 9/44* (2006.01)
*G06F 11/14* (2006.01)
*G06F 11/32* (2006.01)

(52) U.S. Cl.
CPC .......... *G06F 9/4401* (2013.01); *G06F 11/1417* (2013.01); *G06F 11/325* (2013.01)

(58) Field of Classification Search
None
See application file for complete search history.

(56) References Cited

U.S. PATENT DOCUMENTS

2008/0282017 A1* 11/2008 Carpenter et al. ............ 710/316
2009/0240934 A1*  9/2009 Chou .................................. 713/2
2012/0011393 A1*  1/2012 Roberts et al. ................. 714/6.3

* cited by examiner

*Primary Examiner* — Paul Yanchus, III
(74) *Attorney, Agent, or Firm* — Novick, Kim & Lee, PLLC; Jae Youn Kim

(57) ABSTRACT

The present invention relates to a multi-BIOS circuit and a BIOS switching method accomplished through the circuit. The multi-BIOS circuit comprises at least two BIOS chips, a SPI Select chip is disposed between the BIOS chips and a Southbridge chip, the BIOS chips are connected to the SPI Select chip pins, and the SPI Select chip is connected to the Southbridge chip pins. The present invention can significantly enhance the safety of computers, and increases the stability as well as the convenience in use and operation.

16 Claims, 1 Drawing Sheet

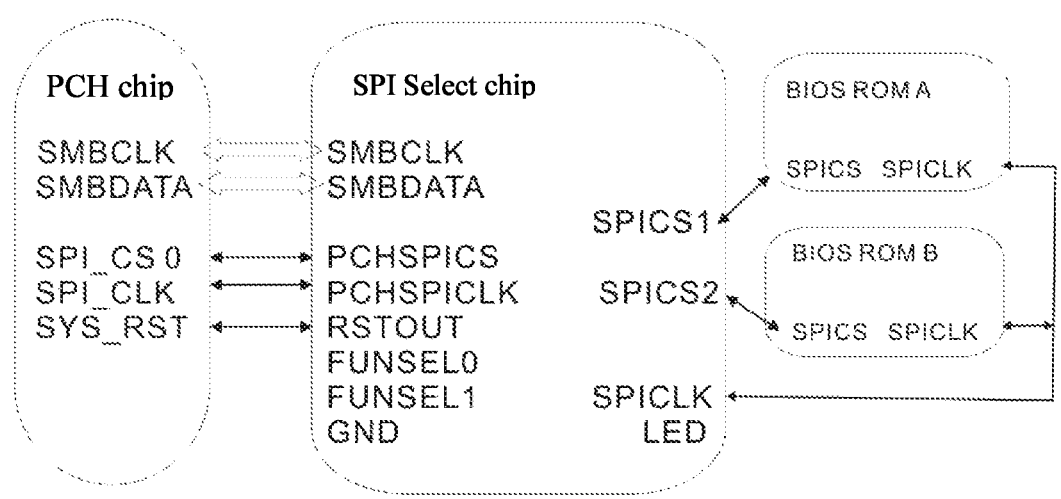

MULTI-BIOS CIRCUIT AND SWITCHING METHOD BETWEEN MULTIPLE BIOS CHIPS

This application claims priority to Chinese Patent Application No. 201210143810.3 filed on May 10, 2012.

BACKGROUND OF THE INVENTION

The subject application generally relates to computers, storage in computers or servers. More particularly, the subject application relates to a circuit including multiple BIOS chips and to a switch circuit between multiple BIOS chips and a method of multi-BIOS switching.

Some storage or server products often require apparatuses to have a higher stability, accordingly, a plurality of BIOSs are disposed on a motherboard to prevent loss or damage of motherboard BIOS parameters when one or some of the BIOSs upgraded is failed or when one of some of the BIOSs are damaged by CIH viruses or the like, which would lead to phenomena such as that the computers cannot be powered on or started or the work environment is unstable. When the aforesaid problems occur, common computer users, except professional maintenance personnel and technicians, may be unable to solve these problems by themselves, and this increases the maintenance cost and time and degrades the users' experience in use. However, if a plurality of BIOSs are disposed on a motherboard, even one of the BIOSs is damaged, the system can still be started from other undamaged BIOSs so that there will be no loss. Currently, there are two ways to achieve the aforesaid function for a common motherboard: the first is to dispose a BIOS having a double capacity on the motherboard and divide the BIOS into two sections; and the other is to dispose two BIOS chips on the motherboard. In these two ways, switching between the BIOS chips is accomplished through software or a jumper setting of pin. The aforesaid ways have the following drawbacks: firstly, the safety is low especially for the first way, and the dual-BIOS system will break down once the BIOS chip is physically damaged; and secondly, the jumper setting of pin needs to be performed by opening the housing and is relatively complex, so it is inconvenient for the common users to perform this operation and other hardware apparatuses may even be damaged when the housing is opened.

Chinese Patent Application No. 200710203022.8 discloses a circuit including two BIOS chips. It utilizes the switching function of switch elements to enable the system to be started from two BIOS chips provided with different program codes, and the way in this such application still lacks intelligence and convenience and adds to the complexity in use.

Chinese Patent Application No. 200820092567.6 discloses a switch-type multi-BIOS selection circuit, which is mainly used in a video card of a computer and requires a user to control the BIOS switching through a Reset key by itself. The operating way in this application is still complex and lacks intelligence and initiative.

It may therefore be desirable to provide a multi-BIOS fitting method as well as an apparatus and a method which enable free and safe switching between multiple BIOSs.

BRIEF SUMMARY OF THE INVENTION

An objective of the present invention is to provide a circuit and a method which can conveniently accomplish starting by switching between multiple BIOSs and feature a low risk and high safety and reliability.

A multi-BIOS circuit of one example embodiment of the subject application includes at least two BIOS chips, and an SPI Select chip is disposed between the BIOS chips and a Southbridge chip, the BIOS chips are connected to the SPI Select chip pins, and the SPI Select chip is connected to the Southbridge chip pins.

In another example embodiment, two system management bus (SMB) pins of the SPI Select chip are connected to two SMB pins of the Southbridge chip respectively; i.e., an SPI clock pin and a chip select signal pin of the SPI Select chip are connected to an SPI clock pin and a chip select signal pin of the Southbridge chip respectively, and an RSTOUT output pin of the SPI Select chip is connected to an SYS_RST pin of the Southbridge chip.

In another example embodiment, the number of the BIOS chips is two or three.

In another example embodiment, an SMBCLK pin and an SMBDATA pin of the SPI Select chip are connected to an SMBCLK pin and an SMBDATA pin of the Southbridge chip respectively.

In another example embodiment, the SPI Select chip comprises a register.

In another example embodiment, the SPI Select chip has a manual mode and an automatic mode.

In another example embodiment, a watchdog timer function is integrated in the SPI Select chip.

In another example embodiment, a light emitting diode (LED) is further integrated in the SPI Select chip.

Another objective of the subject application is to provide a computer motherboard, which comprises a multi-BIOS circuit. The multi-BIOS circuit comprises at least two BIOS chips, and an SPI Select chip is disposed between the BIOS chips and a Southbridge chip, the BIOS chips are connected to the SPI Select chip pins, and the SPI Select chip is connected to the Southbridge chip pins.

A further objective of the subject application is to provide a method of starting by switching between multiple BIOS chips in a multi-BIOS circuit. The multi-BIOS circuit comprises at least two BIOS chips, and an SPI Select chip is disposed between the BIOS chips and a Southbridge chip and electrically connected with the Southbridge chip and the BIOS chips via pins respectively so that starting by switching between the multiple BIOS chips can be accomplished.

In another example embodiment, the switching is achieved by manual selection or automatic selection.

In another example embodiment, the automatic selection is achieved by comparing a watchdog counting time and a BIOS chip starting time through the following steps:

a) setting a watchdog counting time $t_0$;

b) beginning to count by the watchdog when the system is started, wherein the system is started from a first BIOS if a starting time $t_1$ of the first BIOS is shorter than the watchdog counting time $t_0$, and the process proceeds to step c) if $t_1 > t_0$;

c) if $t_1 > t_0$, then a system restarting signal is triggered to restart the system from a second BIOS, and the watchdog begins to count again when the system is restarted, wherein the system is started from the second BIOS if a starting time $t_2$ of the second BIOS is shorter than the watchdog counting time $t_0$, and the process proceeds to step d) if $t_2 > t_0$; and d) if $t_2 > t_0$, then a system restarting signal is triggered to restart the system from a third BIOS, the system is restarted again if a starting time $t_3$ of the third BIOS is longer than the watchdog counting time $t_0$, and the process repeats the aforesaid steps until a starting time $t_n$ of a $N^{th}$ BIOS is shorter than the watchdog counting time $t_0$, and then the system is started from the $N^{th}$ BIOS.

Yet a further objective of the subject application is to provide a method of copying BIOS contents between multiple BIOS chips in a multi-BIOS circuit. The multi-BIOS circuit comprises at least two BIOS chips, and an SPI Select chip is disposed between the BIOS chips and a Southbridge chip and electrically connected with the Southbridge chip and the BIOS chips via pins respectively so that the BIOS contents can be copied between the multiple BIOS chips.

The method of copying BIOS contents between multiple BIOS chips in a multi-BIOS circuit comprises an automatic copying mode and a manual copying mode.

The method of automatically copying BIOS contents between multiple BIOS chips in a multi-BIOS circuit comprises the following steps:

a) setting a watchdog counting time $t_0$;
 b) beginning to count by the watchdog when the system is started, wherein the system is started from a first BIOS if a starting time $t_1$ of the first BIOS is shorter than the watchdog counting time $t_0$, and the process proceeds to step c) if $t_1 > t_0$;
 c) if $t_1 > t_0$, then a system restarting signal is triggered to restart the system from a second BIOS, and the watchdog begins to count again when the system is restarted, wherein the system is started from the second BIOS if a starting time $t_2$ of the second BIOS is shorter than the watchdog counting time $t_0$, and the process proceeds to step d) if $t_2 > t_0$;
 d) if $t_2 > t_0$, then a system restarting signal is triggered to restart the system from a third BIOS, the system is restarted again if a starting time $t_3$ of the third BIOS is longer than the watchdog counting time $t_0$, and the process repeats the aforesaid steps until a starting time $t_0$ of a $N^{th}$ BIOS is shorter than the watchdog counting time $t_0$, and then the system is started from the $N^{th}$ BIOS;
 e) when the system operation proceeds to the POST (power on self-test) process, it is determined by the BIOSs through reading statuses of FUNSEL (0~N) pins via the SMBUS pins that: the system is started from the $N^{th}$ BIOS chip;
 f) setting a register of the SPI Select chip via the SMBUS pins by the BIOSs; and
 g) copying the contents of the $N^{th}$ BIOS chip into another designated BIOS chip via the SPI interface of the Southbridge chip.

The method of manually copying BIOS contents between multiple BIOS chips in a multi-BIOS circuit comprises the following steps:

a) setting a watchdog counting time $t_0$;
 b) beginning to count by the watchdog when the system is started, wherein the system is started from a first BIOS if a starting time $t_1$ of the first BIOS is shorter than the watchdog counting time $t_0$, and the process proceeds to step c) if $t_1 > t_0$;
 c) if $t_1 > t_0$, then a system restarting signal is triggered to restart the system from a second BIOS, and the watchdog begins to count again when the system is restarted, wherein the system is started from the second BIOS if a starting time $t_2$ of the second BIOS is shorter than the watchdog counting time $t_0$, and the process proceeds to step d) if $t_2 > t_0$;
 d) if $t_2 > t_0$, then a system restarting signal is triggered to restart the system from a third BIOS, the system is restarted again if a starting time $t_3$ of the third BIOS is longer than the watchdog counting time $t_0$, and the process repeats the aforesaid steps until a starting time $t_n$ of a $N^{th}$ BIOS is shorter than the watchdog counting time $t_0$, and then the system is started from the $N^{th}$ BIOS; and
 e) after the system is started, the user enters into a BIOS Setup interface to set an option so as to control whether to copy contents of a normal BIOS chip.

The multi-BIOS circuit of the present invention significantly enhances the safety of computers, and features a higher stability and simple operations such as the BIOS starting and content copying so that a common user can operate the multi-BIOS circuit without instructions of a professional.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

Hereinbelow, the present invention will be further described with reference to the attached drawings.

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings:

FIG. 1 is a schematic block diagram of the construction of a circuit in accordance with an example embodiment of the present invention.

DETAILED DESCRIPTION OF THE INVENTION

In order to describe the present invention and benefits thereof more exactly, the present invention will be further described with reference to the accompanying drawings hereinbelow. However, the contents and the scope of the present invention are not limited to what described in embodiments.

A circuit of the present invention comprises two or more BIOS chips, and a SPI Select chip is disposed between a Southbridge chip (a PCH chip) and the BIOS chips. As shown in FIG. 1, the PCH chip and the SPI Select chip are connected via a PCHSPICS pin and a PCHSPICLK pin. Specifically, a chip select signal (PCHSPICS) pin of the SPI Select chip is connected to a chip select signal (SPI_CS 0) pin of the PCH chip, an SPI clock (PCHSPICLK) pin of the SPI Select chip is connected to an SPI clock signal (SPI_CLK) pin of the PCH chip, and two system management bus (SMB) pins (SMBCLK, SMBDATA) of the SPI Select chip are connected to two SMB pins (SMBCLK, SMBDATA) of the PCH chip respectively. Thus, the BIOSs can access the SPI Select chip through the two SMBus lines. The BIOS chips are connected with the SPI Select chip via an SPICS pin. As shown in FIG. 1, BIOS ROM A is connected with an SPICS1 pin of the SPI Select chip via the SPICS pin, BIOS ROM B is connected with an SPICS2 pin of the SPI Select chip via the SPICS pin, and an SPICLK pin of each of BIOS ROM A and BIOS ROM B is connected with an SPICLK pin of the SPI Select chip.

As an embodiment of the present invention, as shown in FIG. 1, the SPI Select chip provides one interface connected to two SPI BIOS chips; i.e., there are two chip select signal pins on the SPI Select chip that correspond to chip select signal pins of two BIOS chips. As an alteration of the technical solution, when more than two BIOS chips are disposed in the circuit, the SPI Select chip needs to be provided with the corresponding number of chip select signal pins in one-to-one correspondence with the chip select signal pins of the BIOS chips. Additionally, the SPI Select chip further has the following functions.

1. The SPI Select chip supports an automatic mode and a manual mode of two operation modes. Selection of the operation modes is determined by settings of hardware pins or software registers. From which BIOS chip the system is started may be determined by pulling up or pulling down an FUNSEL0 pin and an FUNSEL1 pin through hardware (where names and definitions of functions of the hardware pins may be as shown in Table 1), and may also be determined by setting values of the FUNSEL0 and FUNSEL1 registers of the SPI Select chip via the SMBus pins in the BIOSs. Some standard programmable SPI commands are provided in the SPI Select chip, so the registers and the interface of PCH SPI can be set via the SMBus pins, and such operations as reading, writing and erasing for the BIOS chips can be accomplished. These operations are supported in both the manual mode and the automatic mode. In the manual mode, the SPI Select chip sets the values of the FUNSEL[1:0] pins as shown in Table 1 via the SMBus pins to determine from which BIOS chip the system is started. In the automatic mode, the SPI Select chip determines from which BIOS chip the system is started according to the values of the FUNSEL1 pin and the FUNSEL0 pin set through the hardware. As shown in Table 1, when the values of the FUNSEL1 pin and the FUNSEL0 pin are 1:1, the system is started from the BIOS A; and when the values of the FUNSEL1 pin and the FUNSEL0 pin are 1:0, the system is started from the BIOS B, and the system will be restarted from the BIOS A through switching when an error occurs. This switching operation is accomplished through the watchdog function built in the SPI Select chip.

TABLE 1

Values of FUNSEL1: FUNSEL0

| FUNSEL1 | FUNSEL0 | Description of functions |
|---|---|---|
| 1 | 1 | In the automatic mode, the BIOS A is used as a first BIOS storage apparatus. When an error occurs, switching from the BIOS A to the BIOS B will be executed automatically. |
| 1 | 0 | In the automatic mode, the BIOS B is used as a first BIOS storage apparatus. When an error occurs, switching from the BIOS B to the BIOS A will be executed automatically. |
| 0 | 1 | The BIOS A is manually selected as a BIOS storage apparatus. Switching from the BIOS A to the BIOS B will never be executed in any case. |
| 0 | 0 | The BIOS B is manually selected as a BIOS storage apparatus. Switching from the BIOS B to the BIOS A will never be executed in any case. |

2. The SPI Select chip provides a watchdog timer function. When the system is started, the watchdog timer begins to count, and checks whether a BIOS chip is normal by comparing a BIOS chip starting time and a watchdog counting time.

3. The programmable SPI commands include: a Chip Erase command (0xc7), a Read command (0x03), a Program command (0x02), a Write enabled command (0x06), a Write disable command (0x04), a Read status command (0x05), an Enable Write Status command (0x50), and a Write Status command (0x01).

4. Function of indicating statuses of a light emitting diode (LED)

The operating principle of the present invention is as follows. The watchdog timer begins to count when the system is started, the watchdog counting time is supposed to be $t_0$ and is set via the SMBus pins, and a starting time of the first BIOS chip BIOS A is supposed to be $t_1$. If the starting time $t_1$ of the first BIOS chip BIOS A is shorter than the watchdog counting time $t_0$, it represents that the first BIOS chip BIOS A is normal. If the starting time $t_1$ of the first BIOS chip BIOS A is longer than the watchdog counting time $t_0$, it represents that the first BIOS chip BIOS A is damaged. In this case, the SPI Select chip triggers a system restarting command RSTOUT# to send a system restarting signal so that the system is restarted from the second BIOS chip BIOS B. If more BIOS chips are further disposed in the circuit, then the operations are executed according to this principle until the system is started from a normal BIOS chip.

In order to more conveniently use a computer, copying of BIOS contents between the BIOS chips can further be accomplished through software. In this way, all the BIOS chips can operate normally so long as one BIOS chip is normal. The function of copying the BIOS contents between the BIOS chips may also comprise an automatic copying mode and a manual copying mode. In the automatic copying mode, when the BIOSs detect that the first BIOS chip BIOS A is damaged, the SPI Select chip triggers the system restarting command RSTOUT# so that the system is restarted from the second BIOS chip BIOS B; and when the system operation proceeds to the POST (power on self-test) process, the BIOSs find that the system is started from the second BIOS chip BIOS B, then set the register of the SPI Select chip via the SMBus pins and copy the contents of the second BIOS chip BIOS B into the first BIOS chip BIOS A via the SPI interface of the Southbridge chip. In the manual copying mode, when a BIOS chip is damaged, the SPI Select chip triggers the system restarting command RSTOUT# so that the system is restarted from the second BIOS chip BIOS B; and when the system enters into a BIOS Setup interface, an option is set to control whether to copy the contents of the second BIOS chip BIOS B into the first BIOS chip BIOS A. For example, Enabled represents that there is a need to copy, Disabled represents that there is no need to copy, and the default is Disabled. The user may manually change the value of the option so as to determine whether to copy the contents of the BIOSs.

Furthermore, the SPI Select chip further provides an LED display function, and the user can clearly obtain the conditions of the BIOSs during current startup according to a status of the LED. For example, the status display of the LED is set as shown in Table 2. When the contents of the first BIOS chip BIOS A are copied into the second BIOS chip BIOS B or the contents of the second BIOS chip BIOS B are copied into the first BIOS chip BIOS A, the register of the LED in the SPI Select chip needs to be set via the SMBus pins in the BIOS chips.

TABLE 2

Description of the status display of the LED

| Statuses of LED | Description |
|---|---|
| Tristate | Started from BIOS A |
| Low state (low brightness) | Started from BIOS B |
| Pulse jitter of 10 Hz | Refreshed from BIOS B to BIOS A |
| Pulse jitter of 1 Hz | Refreshed from BIOS A to BIOS B |

Embodiment 1 Circuit Comprising Two BIOSs

The circuit of the computer motherboard is provided with two BIOS chips (i.e., a BIOS A chip and a BIOS B chip) therein. An SPICS pin of the BIOS A chip is connected with an SPICS1 pin of the SPI Select chip, and an SPICLK pin of the BIOS A chip is connected with a SPICLK pin of the SPI Select chip. An SPICS pin of the BIOS B chip is connected with an SPICS2 pin of the SPI Select chip, and an SPICLK pin of the BIOS B chip is connected with the SPICLK pin of the SPI Select chip. An SMBCLK pin and a SMBDATA pin of the SPI Select chip are connected to an SMBCLK pin and an SMBDATA pin of a Southbridge chip through two SMBus lines respectively, a PCHSPICS pin of the SPI Select chip is connected to an SPI_CS0 pin of the Southbridge chip, a PCHSPICLK pin is connected to an SPI_CLK pin of a PCH chip, and an RSTOUT output pin of the SPI Select chip is connected to an SYS_RST pin of the PCH chip.

(I) Selection of the BIOS Chips During Startup a) setting a watchdog counting time $t_0$ via the SMBus pins;

b) beginning to count by the watchdog timer when the system is started, wherein the system is started from the BIOS A chip if a starting time $t_1$ of the BIOS A chip is shorter than the watchdog counting time $t_0$, and the process proceeds to step c) if $t_1 > t_0$; and c) if $t_1 > t_0$, then the SPI Select chip triggers the system restarting command RSTOUT# to send a system restarting signal so that the system is restarted from the BIOS B chip, and the watchdog timer begins to count again when the system is restarted, wherein the system is started from the BIOS B chip if a starting time $t_2$ of the BIOS B chip is shorter than the watchdog counting time $t_0$.

(II) Copying of BIOS Contents Between the BIOS Chips

1. Automatic Copying Mode

The SPI Select chip detects that the BIOS A chip is damaged by comparing the watchdog counting time and the system starting time as described in (I), and then triggers the system restarting command RSTOUT# so that the system is restarted from the BIOS B chip. When the system operation proceeds to the POST process, the BIOSs read statuses of an FUNSEL 0 pin and an FUNSEL 1 pin of the SPI Select chip via the SMBus pins. When the value is 10d, it represents that the system is started from the BIOS B chip. When the BIOS chips find that the system is started from the BIOS B chip, a register of some programmable SPI commands in the SPI Select chip is set via the SMBus pins, and the contents of the BIOS B chip are copied into the BIOS A chip via the SPI interface of the Southbridge chip.

2. Manual Copying Mode

The SPI Select chip detects that the BIOS A chip is damaged by comparing the watchdog counting time and the system starting time as described in (I), and then triggers the system restarting command RSTOUT# so that the system is restarted from the BIOS B chip. The system enters into a BIOS Setup interface to set an option so as to control whether to copy the contents of the BIOS B chip into the BIOS A chip. Two options Enabled and Disabled may be set for control of BIOS copying. Enabled represents that there is a need to copy, Disabled represents that there is no need to copy, and the default may be Disabled. The user may manually change the value of the option so as to determine whether to copy.

(III) Inspection of Operating Statuses of the BIOSs

The SPI Select chip is provided with the LED function. Through display of different statuses of the LED shown in Table 2, the user can obtain the current operating statuses of the BIOSs and find out from which BIOS chip the system is started.

Embodiment 2 Circuit Comprising three BIOSs

The circuit of the computer motherboard is provided with three BIOS chips (i.e., a BIOS A chip, a BIOS B chip and a BIOS C chip) therein. An SPICS pin of the BIOS A chip is connected with an SPICS1 pin of the SPI Select chip, and an SPICLK pin of the BIOS A chip is connected with an SPICLK pin of the SPI Select chip. An SPICS pin of the BIOS B chip is connected with an SPICS2 pin of the SPI Select chip, and an SPICLK pin of the BIOS B chip is connected with the SPICLK pin of the SPI Select chip. An SPICS pin of the BIOS C chip is connected with an SPICS3 pin of the SPI Select chip, and an SPICLK pin of the BIOS C chip is connected with the SPICLK pin of the SPI Select chip. An SMBCLK pin and an SMBDATA pin of the SPI Select chip are connected to an SMBCLK pin and a SMBDATA pin of a Southbridge chip through two SMBus lines respectively, a PCHSPICS pin of the SPI Select chip is connected to an SPI_CS0 pin of the Southbridge chip, a PCHSPICLK pin is connected to an SPI_CLK pin of a PCH chip, and an RSTOUT output pin of the SPI Select chip is connected to an SYS_RST pin of the PCH chip.

(I) Selection of the BIOS Chips During Startup a) setting a watchdog counting time $t_0$ via the SMBus pins;

b) beginning to count by the watchdog timer when the system is started, wherein the system is started from the BIOS A chip if a starting time $t_1$ of the BIOS A chip is shorter than the watchdog counting time $t_0$, and the process proceeds to step c) if $t_1 > t_0$;

c) if $t_1 > t_0$, then the SPI Select chip triggers the system restarting command RSTOUT# to send a system restarting signal so that the system is restarted from the BIOS B chip, and the watchdog timer begins to count again when the system is restarted, wherein the system is started from the BIOS B chip if a starting time $t_2$ of the BIOS B chip is shorter than the watchdog counting time $t_0$, and the process proceeds to step d) if $t_2 > t_0$; and d) if $t_2 > t_0$, then the SPI Select chip triggers the system restarting command RSTOUT# again so that the system is restarted from the BIOS C chip.

Likewise, if more BIOS chips are integrated in the circuit and a starting time $t_3$ of the BIOS C chip is longer than the watchdog counting time $t_0$, then the system is restarted again from a next BIOS chip. The process repeats the aforesaid steps until a starting time $t_n$ of a $N^{th}$ BIOS chip is shorter than the watchdog counting time $t_0$, and then the system is started from the $N^{th}$ BIOS chip.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A multi-BIOS circuit comprising at least two BIOS chips, wherein a SPI Select chip is disposed between the BIOS chips and a Southbridge chip, and comprises at least one register and at least one FUNSEL pin, the BIOS chips are connected to the SPI Select chip pins, and the SPI Select chip is connected to the Southbridge chip pins, wherein the SPI Select chip operates in both an automatic mode and a manual mode, and the operation mode is selected by means of setting the at least one FUNSEL pin or the at least one register, and from which BIOS chip of the at least two BIOS chips a system is started is determined by pulling up or pulling down the at least one FUNSEL pin through hardware.

2. The multi-BIOS circuit of claim 1, wherein two system management bus (SMB) pins of the SPI Select chip are connected to two SMB pins of the Southbridge chip respectively.

3. The multi-BIOS circuit of claim 1, wherein an SPI clock pin and a chip select signal pin of the SPI Select chip are connected to an SPI clock pin and a chip select signal pin of the Southbridge chip respectively.

4. The multi-BIOS circuit of claim 1, wherein an RST0UT output pin of the SPI Select chip is connected to an SYS_RST pin of the Southbridge chip.

5. The multi-BIOS circuit of claim 1, wherein an SPI clock pin and a chip select signal pin of each of the at least two BIOS chips are connected to an SPI clock pin and a chip select signal pin of the SPI Select chip respectively.

6. The multi-BIOS circuit of claim 2, wherein an SMBCLK pin and an SMBDATA pin of the SPI Select chip are connected to an SMBCLK pin and an SMBDATA pin of the Southbridge chip respectively.

7. The multi-BIOS circuit of claim 1, wherein the SPI Select chip has a plurality of standard programmable SPI commands to set a value of the at least one register.

8. The multi-BIOS circuit of claim 1, wherein a watchdog timer function is integrated in the SPI Select chip.

9. The multi-BIOS circuit of claim 1, wherein a light emitting diode (LED) is further integrated in the SPI Select chip.

10. A method of starting by switching between multiple BIOS chips in a multi-BIOS circuit, wherein the multi-BIOS circuit comprises at least two BIOS chips, and a SPI Select chip is disposed between the BIOS chips and a Southbridge chip and electrically connected with the Southbridge chip and the BIOS chips via pins respectively so that starting by switching between the multiple BIOS chips can be accomplished, and comprises at least one register and at least one FUNSEL pin, wherein the SPI Select chip operates in both an automatic mode and a manual mode, and the operation mode is selected by means of setting the at least one FUNSEL pin or the at least one register, and from which BIOS chip of the at least two BIOS chips a system is started is determined by pulling up or pulling down the at least one FUNSEL pin through hardware.

11. The method of claim 10, wherein the switching is achieved by manual selection or automatic selection.

12. The method of claim 11, wherein the automatic selection is achieved by comparing a watchdog counting time and a BIOS chip starting time through the following steps:
 a) setting a watchdog counting time t0;
 b) beginning t0 count by the watchdog when the system is started, wherein the system is started from a first BIOS if a starting time t1 of the first BIOS is shorter than the watchdog counting time t0, and the process proceeds to step c) if t1>t0;
 c) if t1>t0, then a system restarting signal is triggered to restart the system from a second BIOS, and the watchdog begins to count again when the system is restarted, wherein the system is started from the second BIOS if a starting time t2 of the second BIOS is shorter than the watchdog counting time t0, and the process proceeds to step d) if t2>t0; and
 d) if t2>t0, then a system restarting signal is triggered to restart the system from a third BIOS, the system is restarted again if a starting time t3 of the third BIOS is longer than the watchdog counting time t0, and the process repeats the aforesaid steps until a starting time tn of a Nth BIOS is shorter than the watchdog counting time t0, and then the system is started from the Nth BIOS.

13. A method of copying BIOS contents between multiple BIOS chips in a multi-BIOS circuit, wherein the multi-BIOS circuit comprises at least two BIOS chips, and a SPI Select chip is disposed between the BIOS chips and a Southbridge chip and electrically connected with the Southbridge chip and the BIOS chips via pins respectively so that the BIOS contents can be copied between the multiple BIOS chips, and comprises at least one register and at least one FUNSEL pin, wherein the SPI Select chip operates in both an automatic mode and a manual mode, and the operation mode is selected by means of setting the at least one FUNSEL pin or the at least one register, and from which BIOS chip of the at least two BIOS chips a system is started is determined by pulling up or pulling down the at least one FUNSEL pin through hardware.

14. The method of claim 13 comprising an automatic copying mode and a manual copying mode.

15. The method of claim 14, wherein the automatic copying mode comprises the following steps:
 a) setting a watchdog counting time t0;
 b) beginning t0 count by the watchdog when the system is started, wherein the system is started from a first BIOS if a starting time t1 of the first BIOS is shorter than the watchdog counting time t0, and the process proceeds to step c) if t1>t0;
 c) if t1>t0, then a system restarting signal is triggered to restart the system from a second BIOS, and the watchdog begins to count again when the system is restarted, wherein the system is started from the second BIOS if a starting time t2 of the second BIOS is shorter than the watchdog counting time t0, and the process proceeds to step d) if t2>t0;
 d) if t2>t0, then a system restarting signal is triggered to restart the system from a third BIOS, the system is restarted again if a starting time t3 of the third BIOS is longer than the watchdog counting time t0, and the process repeats the aforesaid steps until a starting time tn of a Nth BIOS is shorter than the watchdog counting time t0, and then the system is started from the NthBIOS;
 e) when the system operation proceeds to the POST (power on self-test) process, it is determined by the BIOSs through reading statuses of FUNSEL (0~N) pins of the SPI Select chip via the SMBUS pins that: the system is started from the Nth BIOS chip;
 f) setting a register of the SPI Select chip via the SMBUS pins by the BIOSs; and
 g) copying the contents of the Nth BIOS chip into another designated BIOS chip via the SPI interface of the Southbridge chip.

16. The method of claim 14, wherein the manual copying mode comprises the following steps:
 a) setting a watchdog counting time t0;
 b) beginning t0 count by the watchdog when the system is started, wherein the system is started from a first BIOS if a starting time t1 of the first BIOS is shorter than the watchdog counting time t0, and the process proceeds to step c) if t1>t0;

c) if t1>t0, then a system restarting signal is triggered to restart the system from a second BIOS, and the watchdog begins to count again when the system is restarted, wherein the system is started from the second BIOS if a starting time t2 of the second BIOS is shorter than the watchdog counting time t0, and the process proceeds to step d) if t2>t0;

d) if t2>t0, then a system restarting signal is triggered to restart the system from a third BIOS, the system is restarted again if a starting time t3 of the third BIOS is longer than the watchdog counting time t0, and the process repeats the aforesaid steps until a starting time tn of a Nth BIOS is shorter than the watchdog counting time t0, and then the system is started from the NthBIOS; and e) after the system is started, the user enters into a BIOS Setup interface to set an option so as to control whether to copy contents of a normal BIOS chip.

* * * * *